Patented Nov. 4, 1924.

1,513,923

UNITED STATES PATENT OFFICE.

ROBERT J. MONTGOMERY, OF ROCHESTER, NEW YORK, ASSIGNOR TO BAUSCH & LOMB OPTICAL COMPANY, OF ROCHESTER, NEW YORK, A CORPORATION OF NEW YORK.

GLASS AND COMPOSITION THEREFOR.

No Drawing.    Application filed April 2, 1923.   Serial No. 629,424.

*To all whom it may concern:*

Be it known that I, ROBERT J. MONTGOMERY, a citizen of the United States, residing at Rochester, in the county of Monroe and State of New York, have invented certain new and useful Improvements in Glass and Compositions Therefor; and I do hereby declare the following to be a full, clear, and exact description of the same.

My invention relates to an improvement in composition of optical glasses known generally as barium glasses and containing large amounts not less than thirty-five per cent of barium oxide. These glasses are largely used by manufacturers of optical instruments for lenses and other parts where transparent glasses possessing certain optical properties are required. These glasses are also known as dense barium crowns and densest barium crowns and have an index of refraction of 1.585 to 1.625 and a dispersion as expressed by V from 48 to 63.

It is well known that glasses of this type usually contain small bubbles and the manufacturers of such glass have frequently stated in their catalogs that this type of glass cannot be made free from bubbles. I have discovered however that the addition of antimony oxide to glasses of this type greatly improves the quality in respect to bubbles and also, antimony oxide can be used to advantage in control of the index of refraction and dispersion.

Extensive experiments have shown that a glass very poor by reason of bubbles will be decidedly improved by the addition of .3 to 3.0% antimony oxide. If the glass is fair or contains comparatively few bubbles in many cases the addition of antimony oxide will give a glass practically free from bubbles.

Several glasses in particular which have been considered to be the hardest to obtain free from bubbles have the following optical properties.

Table 1.

|     | Refractive Index. $N_D$. | Dispersion. V. |
|-----|--------------------------|----------------|
| (1) | 1.6110                   | 58.8           |
| (2) | 1.6150                   | 54.7           |
| (3) | 1.6103                   | 57.2           |
| (4) | 1.616                    | 58.2           |
| (5) | 1.612                    | 57.7           |

All of these glasses are materially improved by the use of antimony oxide and most of them can be made practically free from bubbles.

The compositions of these barium glasses vary considerably because of the wide range of optical properties. The following table gives about the range of percentages of the main constituents but small amounts of other constituents may be employed without exceeding the scope of this invention.

Table 2.

|           | Per cent. |
|-----------|-----------|
| $SiO_2$   | 25 –40    |
| $BaO$     | 52 –35    |
| $B_2O_3$  | 18 – 5    |
| $K_2O$ or $Na_2O$ | 0 – 7 |
| $PbO$     | 0 – 5     |
| $ZnO$     | 0 –10     |
| $Al_2O_3$ | 0 – 8     |
| $Sb_2O_3$ | 0.3– 3.0  |
| $As_2O_3$ | 0 – 0.8   |
| $CaO$     | 0 – 5.0   |

The wide variations as given are necessary to allow the control of optical properties within the limits given. If antimony oxide is increased above 3.0%, a distinct yellow color is obtained which increases the absorption of light in the glass. This cannot be allowed in a clear optical glass in which the absorption must be kept to a minimum.

The Table (3) below gives several glass compositions as examples of the glasses referred to and the quantities of antimony which will accomplish the results mentioned. I do not however, desire to limit myself to the batches given, and prefer to employ the limits given in Table 2.

*Table 3.*

|  | 1 | 2 | 3 | 4 | 5 | 6 | 7 |
|---|---|---|---|---|---|---|---|
| $SiO_2$ | 30.51 | 26.50 | 35.00 | 39.00 | 32.00 | 37.00 | 33.50 |
| BaO | 50.21 | 46.00 | 41.50 | 35.00 | 44.00 | 41.50 | 42.50 |
| $B_2O_3$ | 12.05 | 16.00 | 10.00 | 7.00 | 17 | 10.00 | 10.50 |
| $K_2O$ & $Na_2O$ | 0 | 4.10 | 5.00 | 2.60 | 3.50 | 5.00 | 2.60 |
| PbO | 0 |  |  | 3.00 | 2.22 |  |  |
| $Al_2O_3$ | 4.14 |  | 1.00 | 1.50 |  |  | 6.00 |
| $Sb_2O_3$ | .90 | .80 | 1.00 | .70 | .78 | 3.00 | .50 |
| $As_2O_3$ |  | .50 |  |  | .50 | .50 | .7 |
| ZnO | 2.00 | 6.10 | 6.00 | 5.50 |  | 3.00 | 7.00 |
| CaO | .17 |  |  | 5.00 |  |  |  |

In view of the difficulty of determining the quantities of the chemicals that remain in the glass when completed, my invention comprehends also the mix from which the glass is formed and the process of making it involving the use of the antimony oxide.

I claim as my invention:

1. A barium glass composition containing barium oxide in excess of thirty per cent and not to exceed three per centum of antimony oxide.

2. In the manufacture of practically colorless barium optical glass compositions the addition of a quantity of antimony oxide not exceeding three per centum of the mixture.

3. A mixture for making practically colorless barium optical glass containing barium oxide in excess of thirty per centum and not to exceed three per centum of antimony oxide.

ROBERT J. MONTGOMERY.